United States Patent [19]

Nonaka et al.

[11] 4,333,558

[45] Jun. 8, 1982

[54] PHOTOELECTRIC CONTROL SYSTEM FOR PARTS ORIENTATION

[75] Inventors: Takeyoshi Nonaka; Kazuo Otsuka, both of Hino, Japan

[73] Assignee: Shinko Electric Co., Ltd., Tokyo, Japan

[21] Appl. No.: 846,103

[22] Filed: Oct. 27, 1977

Related U.S. Application Data

[63] Continuation-in-part of Ser. No. 683,938, May 6, 1976, abandoned.

[51] Int. Cl.[3] .............................................. B65G 47/24

[52] U.S. Cl. ...................................... 198/391; 198/395

[58] Field of Search ............... 198/380, 391, 395, 398, 198/401, 459, 493, 755, 757, 771; 193/32, 40; 250/223 R, 223 B; 221/160

[56] References Cited

U.S. PATENT DOCUMENTS

| | | | |
|---|---|---|---|
| 2,807,350 | 9/1957 | Rayburn et al. | 198/391 |
| 3,101,832 | 8/1963 | Wyle et al. | 198/391 |
| 3,289,808 | 12/1966 | Simmons | 198/395 |
| 3,678,254 | 7/1972 | Graff | 250/223 R |
| 3,835,983 | 9/1974 | Horll | 198/755 |
| 3,956,629 | 5/1976 | Gomm et al. | 250/223 R |
| 4,000,807 | 1/1977 | Molique | 198/757 |

FOREIGN PATENT DOCUMENTS

| | | | |
|---|---|---|---|
| 951337 | 3/1964 | United Kingdom | 193/32 |
| 273630 | 9/1970 | U.S.S.R. | 198/391 |

*Primary Examiner*—Joseph E. Valenza
*Attorney, Agent, or Firm*—Lane, Aitken, Kice & Kananen

[57] ABSTRACT

A photoelectric control system for parts orientation for automatically checking attitudes of individual parts which are successively transferred along a parts feeding track of a parts feeder. The system includes at least one photoconductive detecting element mounted at one side of a predetermined detecting position on the feeding track and normally exposed to light incident thereon across the feeding track. The system includes an adaptable circuit means for activating a parts rejecting means to remove a part from the feeding track depending on the signals from the detecting elements. The system also includes a spacing means for spacing apart the parts which successively pass the detecting position.

16 Claims, 28 Drawing Figures

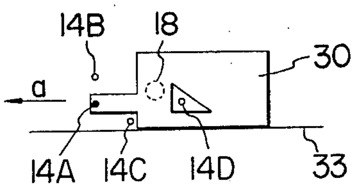
I Fig.4A
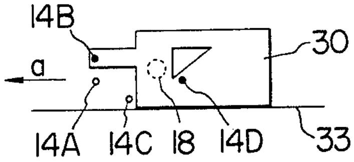
II Fig.4B
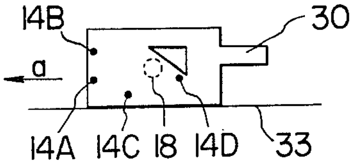
III Fig.4C
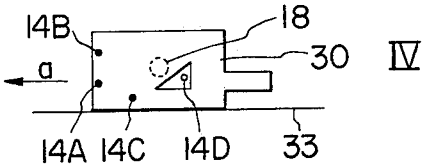
IV Fig.4D
Fig.3
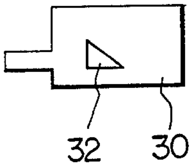
Fig.5
| Attitudes | 14A | 14B | 14C | 14D | Qutput |
|---|---|---|---|---|---|
| I | 1→0 | 1 | 1 | 1 | 0 |
| II | 1 | 1→0 | 1 | 0 | 1 |
| III | 1→0 | 1→0 | 0 | 0 | 1 |
| IV | 1→0 | 1→0 | 0 | 1 | 1 |

Fig.6
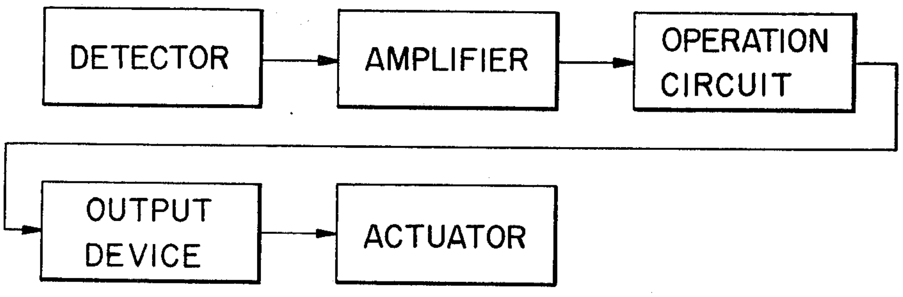
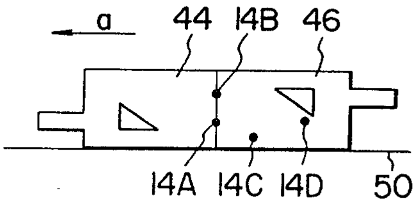
Fig.7A
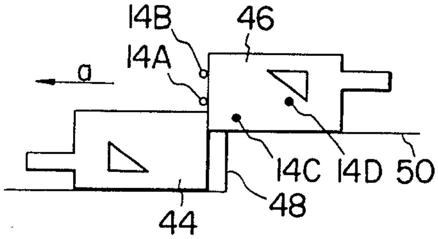
Fig.7B
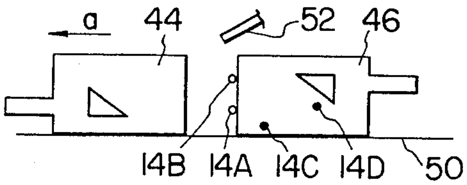
Fig.7C
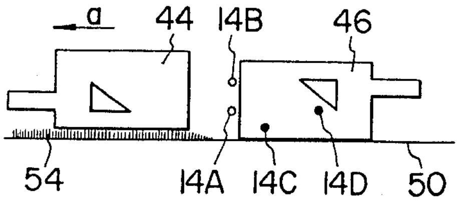
Fig.7D

Fig.8
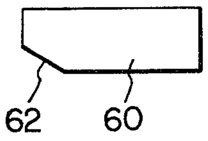
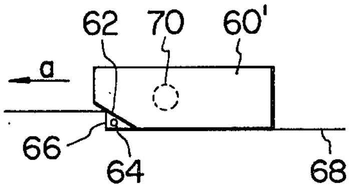
Fig.9A
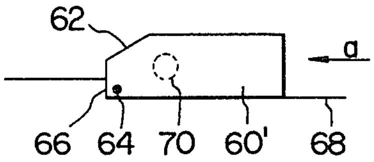
Fig.9B
Fig.10
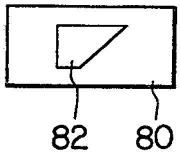
Fig.11

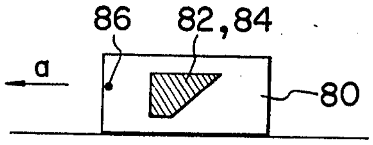
Fig.12A
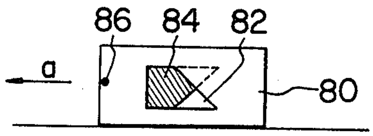
Fig.12B
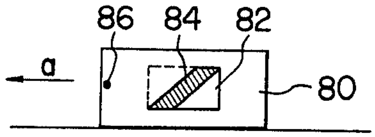
Fig.12C
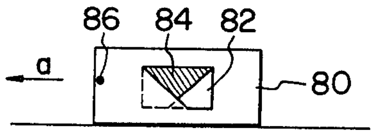
Fig.12D
Fig.13
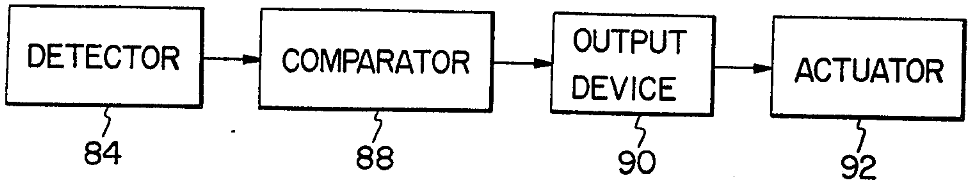

PHOTOELECTRIC CONTROL SYSTEM FOR PARTS ORIENTATION

BACKGROUND OF THE INVENTION

This application is a Continuation-in-Part of U.S. Patent Application Ser. No. 683,938, filed May 6, 1976.

This invention relates to a photoelectric control system for parts orientation which is particularly suitable for automatic detection of the attitudes of parts being fed along a parts transfer track or chute of a parts feeder, and for automatic rejection of parts having undesired attitudes to ensure parts feeding with predetermined alignment and attitude.

Conventional means for sorting out incorrectly oriented parts on a parts feeder include attaching mechanical detecting means on a spiral parts transfer track of a parts feeder bowl or the like to detect the attitudes of the individual parts based on general shapes or centers of gravity. Electrical and electromechanical systems have also been proposed. Reliable operation with such systems, however, is difficult with parts having complicated shapes and configurations or with parts which show little differences in the position of center of gravity. Also such systems are not readily adaptable for reliable operation with parts feeding tracks which are used for feeding different parts at different times.

SUMMARY OF THE INVENTION

A principal object of the invention is to provide a novel photoelectric control system for parts orientation which is extremely simple in construction but reliable in operation.

Another object of the invention is to provide a photoelectric control system for parts orientation which can handle parts of almost any shape and configuration with high precision and efficiency.

Still another object of the invention is to provide a photoelectric control system for parts orientation which has spacer means for spacing the parts at a predetermined detecting position on a parts transfer track.

A still further object of the invention is to provide a photoelectric control system for parts orientation which can operate either on digital or analog signals.

A still further object of the invention is to provide circuit means which may be readily adapted or switched so that the system may be readily adapted for use with differently shaped parts on a parts feeding track.

The photoelectric control system for parts orientation according to the invention comprises at least one photoconductive detecting element mounted on a movable transferring means adapted to impart movement to parts on the parts feeding track and located at one side of a predetermined detecting position on the parts feeding track, a synchronizing photoconductive element mounted on said movable transferring means at a predetermined location relative to said location of said photoconductive detecting element and providing synchronizing signals, a light source for projecting light across the parts feeding track to said photoconductive elements, said photoconductive elements having light receiving faces normally exposed to said light and being adapted to produce a rejection signal and a synchronizing signal when said light is intercepted by a part not having a predetermined orientation passing said detecting position and switchable electric circuit means connected to said photoconductive elements for discriminating between said rejection signal and a predetermined normal signal for actuating a parts rejecting means upon receipt of said rejection signal.

In a more practical form of the invention, the photoelectric control system for parts orientation further includes a spacer means for spacing apart the parts at the detecting position to preclude detection failures due to connected parts.

The foregoing and other objects, features and advantages of the invention will become clear from the following description of preferred embodiments and appended claims, taken in conjunction with the accompanying drawings.

BRIEF DESCRIPTION OF THE DRAWINGS

The accompanying drawings show by way of example preferred embodiments of the invention, in which:

FIG. 3 is a diagrammatic view of a part of a particular shape which is employed by way of example for the explanation of the invention;

FIG. 4A to 4D are diagrammatic views showing mounting positions of photoconductive detecting and synchronizing elements in relation with four different attitudes of the part of FIG. 3;

FIG. 5 is a function table showing the conductive and nonconductive states of the detecting and synchronizing elements in relation with the different attitudes of the parts;

FIG. 6 is a block diagram of the control system of the invention;

FIG. 7A is a diagrammatic view showing two connected parts;

FIGS. 7B and 7D are diagrammatic views showing spacer means for spacing apart connected parts at the detecting position;

FIG. 8 is a diagrammatic view showing a part of a different shape;

FIGS. 9A and 9B are diagrammatic views showing another embodiment of the invention, which is intended to handle parts similar to the one shown in FIG. 8;

FIG. 10 is a diagrammatic view showing a part with an aperture in its web;

FIG. 11 is a diagrammatic view of a light receiving face of a photoconductive detecting element shaped to match the aperture in the part of FIG. 10 to produce analog signals;

FIGS. 12A to 12D are diagrammatic views showing variations in the area of the light receiving face of the photoconductive detecting element which receives light through the aperture in the part in four different attitudes;

FIG. 13 is a block diagram showing another control system of the invention.

DESCRIPTION OF PREFERRED EMBODIMENTS

Figure 1:
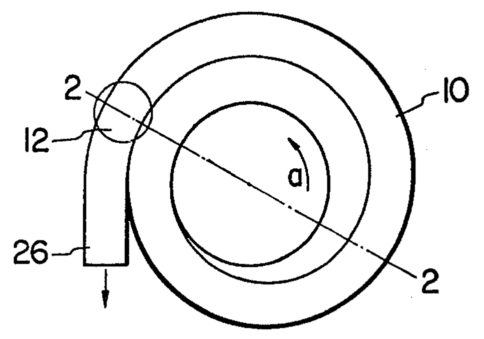
FIG. 1 is a diagrammatic plan view of a parts feeder employing the photoelectric control system for parts orientation according to the invention.
Figure 2:
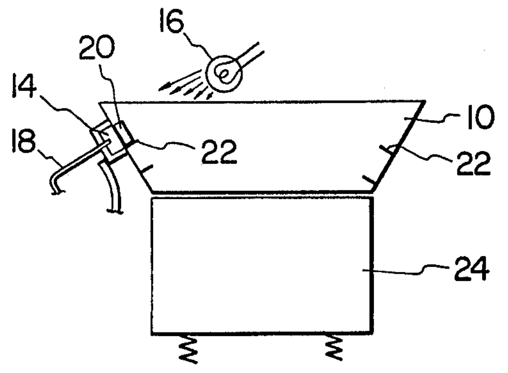
FIG. 2 is a diagrammatic vertical cross-section of the parts feeder taken along the line 2—2 of FIG. 1.

Referring to the accompanying drawings and first to FIGS. 1 and 2, indicated generally at 10 is a parts feeder bowl which is provided with the control system for parts orientation 12 according to the invention, including at a predetermined detecting position a photoconductive element 14, a light projector 16 and a parts rejector 18 in the form of an air nozzle. The parts 20 are caused to advance along a spiral track 22 of the parts feeder bowl 10 by vibrations which are generated by a vibratory driving unit 24 in the usual manner, thereby transferring the parts 20 in the direction of arrow (a) toward an outlet 26 through which only those parts which are in the correct attitude are successively discharged. The number and mounting positions of the photoconductive elements 14 vary with the particular shape of the parts to be handled, but are preferably mounted so that their faces are mounted flush with a surface of the parts feeding track along which the parts move. Such an arrangement minimizes relative motion between the parts and the photoconductive elements for reliable operation based on fine details of the shapes of the parts on the parts feeding track.

FIG. 3 shows one example of a part 30 which has a punched triangular aperture 32, and FIGS. 4A to 4D show four photoconductive elements 14A to 14D which are positioned to cope with four different attitudes which may be assumed by the part of FIG. 3. Each of the photoconductive elements 14A to 14D normally remains conductive due to a parallel light ray which is projected from the light projector 16 across the parts transfer track but becomes nonconductive when the light ray is intercepted by a part passing the detecting position on the track 33. The photoconductive elements 14A to 14D are connected to the respective amplifiers 36 FIG. 6 to produce digital signals of "1" and "0" in response to the conductive and nonconductive states of the elements 14A to 14D. Of the four photoconductive elements 14A to 14D, the first two elements 14A and 14B are employed as synchronizing means which produce a synchronizing signal upon detection of arrival of a part 30 at the predetermined detecting position, while the other two elements 14C and 14D are employed as detectors which are used to judge the attitude of an arriving part of the type shown in FIG. 3. The electric circuit to accomplish this will be further described in detail.

FIG. 5 is a function table depicting the states of the respective photoconductive elements 14A and 14B as occurring at the instant when either one or both of the synchronizing element 14A and 14B are intercepted by a part 30 which has just arrived at the detecting position in different attitudes as shown in FIGS. 4A to 4D. The correct attitude of FIG. 4A is distinguishable from the undesired attitudes in that the detecting elements 14C and 14D both have the "1" state only when the part 30 is in the correct attitude at the detecting position.

In order to distinguish the respective attitudes of FIGS. 4A to 4D, amplified digital signals from respective amplifiers 36 (FIG. 6) are fed to an operation circuit 38. Upon detection of an incorrect attitude, the operation circuit 38 drives an output device 40, preferably of a completely contactless type such as an SCR or a Triac to energize an actuator 42. The actuator 42 may, for example, be an electromagnetic valve controlling the air flow through an air nozzle 18 to cause an incorrectly oriented part to be blown off of the parts feeding track and thereby returned to the bottom of the bowl 10. By rejecting incorrectly oriented parts from the spiral track 22 in this manner, only those parts having a predetermined correct attitude are allowed to pass the detecting position to be discharged successively through the outlet 26 of the parts feeder bowl.

The control system decision to reject as described above, however, may be erroneous when a number of parts come together, with a fore end of a succeeding part 46 completely connected to the rear end of a preceding part 44 as shown, for example, in FIG. 7A, in which two parts are connected and appear as an integral single part. FIGS. 7B to 7D shown various automatic spacer means according to the present invention to prevent erroneous parts rejection decisions in such instances. In FIG. 7B, for example, a downward step 48 is provided on the track surface 50 in front of the photoconductive detecting elements, and the detecting elements are mounted so that a preceding part 44 will not interfere or overlap with a succeeding part 46 at the detecting position. In FIG. 7C an air nozzle 52 having its air spouting end disposed immediately downstream of the detecting position is employed to push forward a part which has just passed inspection at the detecting position. An appropriately placed air spout having a spouting end disposed toward the detecting position could also be used as a spacer means. In FIG. 7D a strip of woolen cloth 54 is adhered on the parts feed track surface immediately downstream of the detecting position so that a preceding part 44 is caused to advance at an accelerated speed upon passing inspection at the detecting position, getting completely clear of the succeeding part 46. A strip of woolen cloth at the detecting position could also be used.

FIG. 8 shows a differently shaped part 60 having a simple rectangular shape with a fore bottom edge cut off 62 to be used with the parts orientation system of the present invention. When the system is used with this part, it suffices to provide a single photoconductive detecting element 64 at the foot of a step 66 provided on and across a parts transfer track 68 of a parts feeder as shown particularly in FIGS. 9A and 9B. A part 60 having the desired attitude advances along the parts feeding track and rides over the step 66 without intercepting the light beam to the detecting element 64 as shown in FIG. 9A. However, should the part 60 have an incorrect attitude such as shown in FIG. 9B, the electric circuit connected to the detecting element 64 may be adapted to actuate an electromagnetic valve controlling an air nozzle to blow the incorrectly oriented part off the track to the bottom of the bowl. In this manner, all of the parts which successively pass the detecting position on the transfer track of the parts feeder are checked for correct attitude, and only parts having incorrect or undesired attitudes are rejected, thereby ensuring that only parts having predetermined desired attitudes are discharged at the outlet of the parts feeder.

Figure 14:
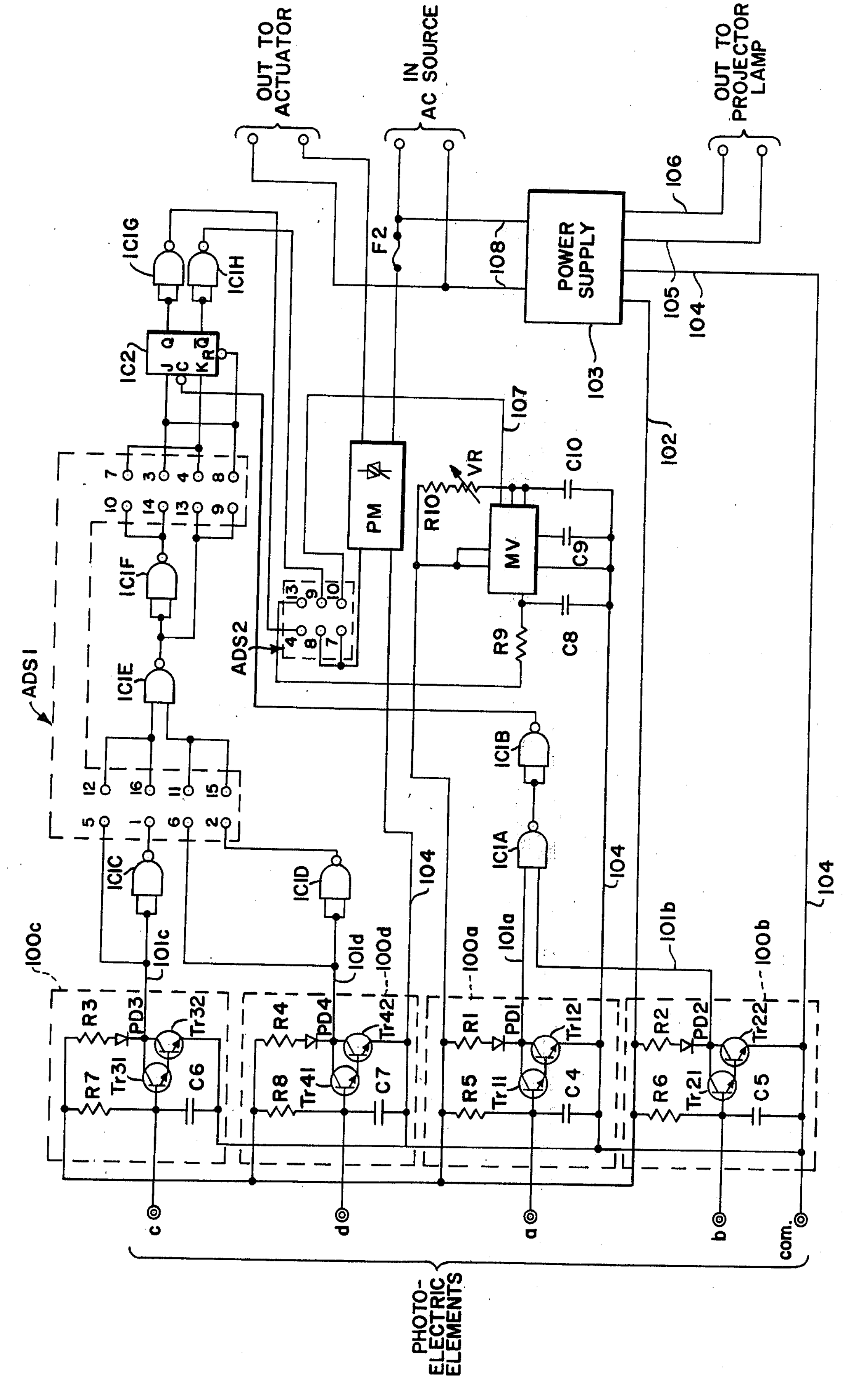
FIG. 14 is a partial block, partial schematic diagram showing further details of the switchable electric circuit means of the invention.

FIG. 14 is a partial block, partial schematic diagram of the electric circuit apparatus of FIG. 6. As will be seen in the following discussion, this apparatus is readily adaptable by means of switching means or wired connector plugs to be used in a parts orientation system with any one of many differently shaped parts, without mechanical adjustments to the system such as changing positions of the photoelectric elements.

As shown in FIG. 14, the circuit provides for four inputs, "a", "b", "c", and "d", each referenced with respect to COM (common ground), for four photoelectric elements (not shown in FIG. 14). The input "a" and the associated input circuit 100*a* are exemplary and will be discussed in detail.

Input "a" is connected to an input circuit 100*a* and therein to the base of a transistor Tr11. The base of the transistor Tr11 is coupled to the common ground 104 through a capacitor C4 and connected through a resistor R5 to a positive DC source 102 from a power supply 103. The emitter of the transistor Tr11 is connected to the base of a transistor Tr12, the emitter of which is connected to the common ground. The collector of the transistor Tr11, is connected to the collector of the transistor Tr12, and both collectors are connected to an output signal line 101*a* and to the cathode of a photodiode PD1 (such as an LED), the anode of which is connected to the positive DC source 102 through a resistor R1. With this circuit arrangement the state of the signal on line 101*a* depends upon the state of the photoelectric element connected at the input "a".

It will be apparent that each of the other input circuits 100*b*, 100*c*, and 100*d* connected to the inputs "b", "c", and "d" respectively and providing output signals on signal lines 100*b*, 101*c* and 101*d* respectively operate in a similar manner. More specifically, it should be apparent that the resistor R5 in circuit 100*a* corresponds to resistors R6, R7, and R8 in the other circuits; that the capacitor C4 similarly corresponds to capacitors C5, C6, and C7; that the transistor Tr11 corresponds to transistors Tr21, Tr31, and Tr41; that the transistor Tr12 corresponds to transistors Tr22, Tr32, and Tr42; that the photodiode PD1 corresponds to photodiodes PD2, PD3, and PD4; and that the resistor R1 corresponds to resistors R2, R3, and R4 respectively in each of the other input circuits 100*b* , 100*c* , and 100*d*.

The two output signal lines 101*a* and 101*b* from input circuits 100*a* and 100*b* are connected to the inputs of a two input NAND gate IC1A, the output of which is connected to the input of an inverter IC1B. The output of the inverter IC1B is connected to the "clock" C input to a J-K flip flop IC2. The output signal line 101*c* from the input circuit 100*c* is connected to pin 5 of a connector socket ADS1 and to the input of an inverter IC1C, the output of which is connected to pin 1 of the socket ADS1. Similarly, the output signal line 101*d* from the input circuit 100*d* is connected to pin 6 of the socket ADS1 and to the input of an inverter IC1D, the output of which is connected to pin 2 of the socket ADS1.

Pins 12 and 16 of the socket ADS1 are connected to one input of a two-input NAND gate IC1E, the other input of which is connected to pins 11 and 15 of the socket ADS1. The output of the NAND gate IC1E is connected to pins 9 and 13 of the socket ADS1 and to the input of an inverter IC1F, the output of which is connected to pins 10 and 14 of the socket ADS1.

Pins 3 and 8 of the socket ADS1 are connected to the J input and the reset (R) input of the J-K flip-flop IC2. Pins 4 and 7 of the socket ADS1 are connected to the K input of the J-K flip-flop IC2. The Q output of the J-K flip-flop IC2 is connected to the input of an inverter IC1G, the output of which is connected to pin 4 of a second adaptor socket ADS2. The Q output of the J-K flip-flop IC2 is connected to the input of an inverter IC1H, the output of which is connected to pin 9 of the socket ADS2.

The circuit of FIG. 14 includes a one-shot multivibrator circuit providing an output signal on a signal line 107 and comprising an integrated circuit one-shot multivibrator MV and associated timing capacitors C8, C9, and C10, and timing resistors R9, R10, and VR. The resistor VR is a variable resistor to facilitate timing adjustments. Selection of the timing resistors and capacitors determines the multivibrator circuit delay and output pulse characteristics. The trigger input to the multivibrator circuit is provided through the resistor R9 which is connected to pin 13 of the socket ADS2. The output pulse from the multivibrator circuit on signal line 107 is connected to pin 10 of the socket ADS2.

Pins 7 and 8 of the socket ADS2 are connected to the control input of a switching means PM which preferably includes a Triac or SCR contactless switching device. The other control input of switching means PM is connected to the common circuit ground 102. One switch controlled terminal of the switching device PM is connected through a fuse F2 to an AC power source input terminal, and the other switch controlled terminal is connected to an output connector to the actuator means (not shown). The other terminal of the actuator connector is connected directly to an AC source input terminal. It is therefore seen that an AC power source signal will be present or absent at the output connector terminals to the actuator depending upon the switching state of the switching device PM which, in turn, depends on the state of control signal at the input of the switching device PM.

As also seen in FIG. 14, the power supply 103 has its input terminals 108 connected directly to the AC power source input. Output terminals 105 and 106 of the power supply 103 provide signals to be connected to the projector lamp (not shown in FIG. 14) to operate the lamp. The power supply is also connected to the common ground on signal line 104 and provides a positive DC voltage with respect to common ground on the signal line 102. This positive DC voltage is provided to various of the circuit elements.

Figure 15:
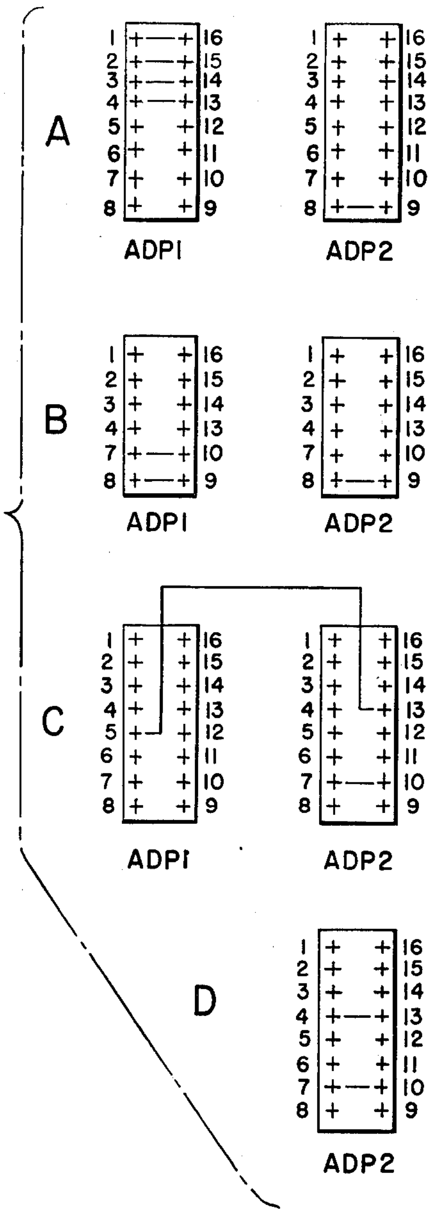
FIGS. 15A to 15D is a schematic diagram of certain switching connector means used in conjunction with the apparatus of FIG. 14 for readily adapting the invention to operate with different parts on a parts feeding track.

The operation of the circuit apparatus of FIG. 14 may be controlled and switched by adapter plugs ADP1 and ADP2 such as shown in FIG. 15 which may be plugged into adapter sockets ADS1 and ADS2, respectively, of the circuit of FIG. 14. This arrangement permits the manual operator of the photoelectric parts orientation control system of the invention to rapidly adapt the control system to function with differently shaped parts. This is accomplished by appropriately changing the adaptor plugs ADP1 and ADP2, but without making any mechanical changes to the system such as changing the positioning of the photoelectric elements.

For example, with the adaptor plugs ADP1 and ADP2 configured as in FIG. 15A, the actuator will operate if both of the photoelectric elements connected to inputs "c" and "d" are shaded and either of the elements connected to inputs "a" and "b" are shaded. The actuator, however, cannot operate, if either of the elements connected to "c" and "d" is lighted. From this explanation it is seen that the distinction between photoelectric detection and synchronization elements is somewhat arbitrary and depends upon the definitions of elements connected to inputs "a", "b", "c", and "d".

In FIG. 15B, on the other hand, the adaptor plugs ADP1 and ADP2 are shown configured so that the actuator will operate when either element connected to input "a" or "b" is shaded, provided either or both of the elements connected to input "c" and "d" are lighted or if both of the elements connected to inputs "c" and "d" are lighted.

In FIG. 15C, on the other hand, the adaptor pulgs ADP1 and ADP2 are shown configured to operate the actuator based on the state of the photoelectric element connected to input "c", regardless of the states of the other photoelectric elements connected to inputs "a", "b", and "d", and depending upon the timing signals provided by the multivibrator circuit. With the adaptor plug arrangement of FIG. 15C, the actuator operates when the element connected to input "c" is shaded.

When the actuator operation signal provided with the adaptor plug ADP2 configured as shown in FIGS. 15A and 15B is too short to provide the necessary actuator operation (e.g. reliable rejection of the improperly oriented part), the adaptor plug ADP2 configured as shown in FIG. 15D may be substituted for that shown in FIGS. 15A and 15B so that the actuator operation period may be lengthened. In field operation, the duration of the actuator operation period can be controlled by the setting of the variable resistor VR which, of course, may be preset.

In the foregoing embodiments of the invention, the photoconductive element or elements are utilized essentially as digital signal sources and the signals therefrom are processed digitally with signal processing means including digital logic means. However, with appropriate modifications, the photoconductive elements may also be used as analog signal sources, in which event, the electric circuit means will include analog signal processing means.

For example, in the case of parts having shapes such as the part 80 in FIG. 10 having an aperture or opening 82 in its web, the photoconductive element 84 may be selected to have its light receiving face of a shape the same as the aperture 82. For example, the element 84 may be selected to have a trapezoidal shape as shown in FIG. 11 to correspond to the trapezoidal aperture 82 in the part 80 of FIG. 10 when such part passes the detecting position in a predetermined attitude. In such a case, the output signal from the detecting element 84 will be related to the percentage of the total light receiving face actually receiving light through the aperture 82 as the part 80 passes the detecting position. Such an output signal will, accordingly, vary with the attitude of the part 80 as shown in FIGS. 12A to 12D. The detecting element 84 will produce an analog signal of varying levels which can be detected in a suitable comparator circuit 88 of known arrangement as shown in FIG. 13 by comparison with a predetermined normal signal. The operation of the comparator can be synchronized by a signal from a photoconductive element 86 which detects the arrival of a part at the detecting position. The comparator circuit 88, upon detection of an incorrect attitude, drives an output device 90, producing an actuator signal to energize an actuator 92 which controls, for example, an air nozzle used to blow the incorrectly oriented part off the track to return it to the bottom of the parts feeder bowl.

It will be understood from the foregoing that the attitudes of the individual parts being fed along the transfer track of a parts feeder can be detected exactly by the photoconductive elements which are mounted in suitable positions at one side of a predetermined detecting position on the transfer track, to produce either digital or analog signals indicative of the attitudes of the passing parts. It will also be understood that the operations by the photoelectric control system of the present invention are readily adaptable for orientation of different parts having diverse shapes and configurations. This adaptability can be achieved by electrical switching means, without any need for mechanical adjustments to the system, thereby facilitating adaptability and enhancing reliability. Additionally the photoelectric control system of the present invention minimizes the need for precision machine work on the parts feeder bowl and avoids difficulties with clustering and stagnation of parts such as occurs with conventional attachment type orientation devices.

It is also possible according to the present invention to achieve virtual 100% reliable parts alignment at the output of the parts feeder by mounting the photoconductive detecting and synchronizing elements in appropriate positions on the parts feeding track itself for vibrating movement therewith and with the parts moving thereon. Also, because the time required by the electric circuit apparatus to make a decision on the attitude of each part is only a very small fraction of a second, the efficiency of the parts alignment can be increased drastically compared with the conventional attachment type orientation devices by using a quick-response type actuator.

What is claimed is:

1. A photo-electric control system for controlling the orientation of parts moving along a parts feeding track of a vibratory bowl-type parts feeder, said control system comprising:

plural photo-responsive elements mounted adjacent the parts feeding track in a selected parts detection position and adpated to respond to light directed across the path followed by the parts;

at least one other photo-responsive element mounted adjacent the parts feeding track at the detection position and also adapted to respond to light directed across the path;

a light source for projecting light across the path to said photo-responsive elements;

spacing means for spacing apart parts successively arriving at said detection position;

said first-mentioned photo-responsive elements adapted to produce multiple-state discrimination signals, each discrimination signal indicative of a part orientation;

said second-mentioned photo-responsive element adapted to produce an synchronizing signal when a part interrupts the light to said second-mentioned photo-responsive element;

electronic processing means including a synchronously operable, multiple state storage means adapted to store said discrimination signal or a combination thereof;

pre-programmable switch means connected between said first-mentioned photo-responsive elements and said processing means and having multiple switching configurations to present the discrimination signal or a combination thereof to said electronic processing means;

said second-mentioned photo-responsive elements connected to a synchronous input of said storage means;

said processing means providing a signal indication as to the orientation of the part when said synchronizing signal enables said storage device.

2. The control system claimed in claim 1 wherein said first and second-mentioned photo-responsive elements are mounted on one side of the path with their respective light receiving faces mounted flush with a surface of the parts feeding track along which the parts move.

3. The photo-electric control system claimed in claim 1 wherein the system comprises:

multiple second-mentioned photo-responsive elements for providing more than one synchronizing signal.

4. The photoelectric control system according to claim 1 wherein the signal indication provided by said processing means includes an actuation signal indicating an improperly oriented part and wherein said processing means includes means for causing said actuation signal to have a predetermined fixed duration.

5. The photo-electric control system claimed in claim 1 wherein said storage means comprises:

a J-K flip-flop having its clock input connected to said second-mentioned photo-responsive elements and having its J and K inputs connected to said pre-programmable switch means to receive the discrimination signal or a combination thereof.

6. The photo-electric control system claimed in claim 1 wherein said pre-programmable switch means further comprises:

inter-connection means having pins of a first type connected to said first-mentioned photo-responsive elements and pins of a second type connected to the input of said processing means; and means for connecting selected pins of said first type to selected pins of said second type.

7. The photo-electric control system claimed in claim 6 further comprising:

means connected to said pins of said first type for complimenting the signals provided thereto from said first-mentioned photo-responsive elements and connected to other of said pins of said first type.

8. The photo-electric control system according to claim 1 wherein said spacing means is a downward step provided on the surface of the parts feeding track immediately downstream of said detecting position.

9. The photoelectric control system according to claim 1 wherein said spacing means is a strip of woolen cloth adhered on the surface of the parts feeding track at said detecting position.

10. The photoelectric control system according to claim 1 wherein said spacing means is an air blowing nozzle having the air spouting end thereof disposed toward said detecting position.

11. The photoelectric control system according to claim 1 wherein said spacing means is a strip of woolen cloth adhered on the surface of the parts feeding track immediately downstream of said detecting position.

12. The photoelectric control system according to claim 1 wherein said spacing is an air blowing nozzle having the air spouting end thereof disposed away from said detecting position.

13. A photoelectric control system for orientation of parts moving along a parts feeding track of a vibratory bowl-type parts feeder, each such part being of the type having a known shaped aperture in its web, said control system comprising:

first and second photoconductive elements mounted on the parts feeding track and located at one side of a predetermined detecting position thereon;

a light source for projecting light across the parts feeding track to said photoconductive elements;

spacing means for spacing apart parts successively arriving at said detecting position;

said first element having its light receiving face normally exposed to said light and of a shape corresponding to the shape of the aperture of a part, and mounted flush with a surface of the parts feeding track along which parts move, and producing a discrimination signal based upon a part passing between said light and said first element;

said second element having its light receiving face normally exposed to said light and mounted flush with a surface of the parts feeding track along which parts move, and producing a synchronizing signal based upon a part passing between said light and said second element; and an electric circuit means connected to said first and second elements for producing an actuation signal for a parts rejecting means whenever a part passing said detecting position does not have a predetermined orientation, and including a comparator means for comparing said discrimination signal with a pre-determined normal signal and means for timing the operation of said comparator means based upon said synchronizing signal, to reject improperly oriented parts.

14. The photoelectric control system according to claim 13 wherein said spacing means is an air blowing nozzle.

15. The photo-electric control system according to claim 13 wherein said spacing means is a downward step provided on the surface of the parts feeding track immediately downstream of said detecting position.

16. The photoelectric control system according to claim 13 wherein said spacing means is a strip of woolen cloth adhered on the surface of the parts feeding track at said detecting position.

* * * * *